Dec. 21, 1948. J. E. POTTHARST, JR 2,456,732
COMBINED EVAPORATOR AND BOILER
Filed Feb. 19, 1946 3 Sheets-Sheet 1

INVENTOR.
JOHN E. POTTHARST JR.

Dec. 21, 1948.  J. E. POTTHARST, JR  2,456,732
COMBINED EVAPORATOR AND BOILER
Filed Feb. 19, 1946  3 Sheets-Sheet 2

INVENTOR.
JOHN E. POTTHARST JR

Dec. 21, 1948.   J. E. POTTHARST, JR   2,456,732
COMBINED EVAPORATOR AND BOILER
Filed Feb. 19, 1946                     3 Sheets-Sheet 3

INVENTOR.
JOHN E. POTTHARST JR.

Patented Dec. 21, 1948

2,456,732

UNITED STATES PATENT OFFICE 2,456,732

COMBINED EVAPORATOR AND BOILER

John E. Pottharst, Jr., New Orleans, La.

Application February 19, 1946, Serial No. 648,706

4 Claims. (Cl. 122—32)

My invention comprises certain new and useful improvements in evaporators.

In many types of evaporators it may be necessary to supply some amount of external heat to supplement the usual heating medium for evolving vapors from the solution to be evaporated.

In the accomplishment of this purpose in my invention I provide a unitary evaporator structure in which a liquid is boiled in out-of-contact heat exchange relation with hot gases and the vapors thus evolved are added to the principal supply of heating medium and brought into out-of-contact heat exchange relation with the solution supplied to the evaporator.

In the accompanying drawings, wherein I have illustrated a practical embodiment of the principles of my invention, Fig. 1 is a top plan view of the evaporator;

Figure 1:
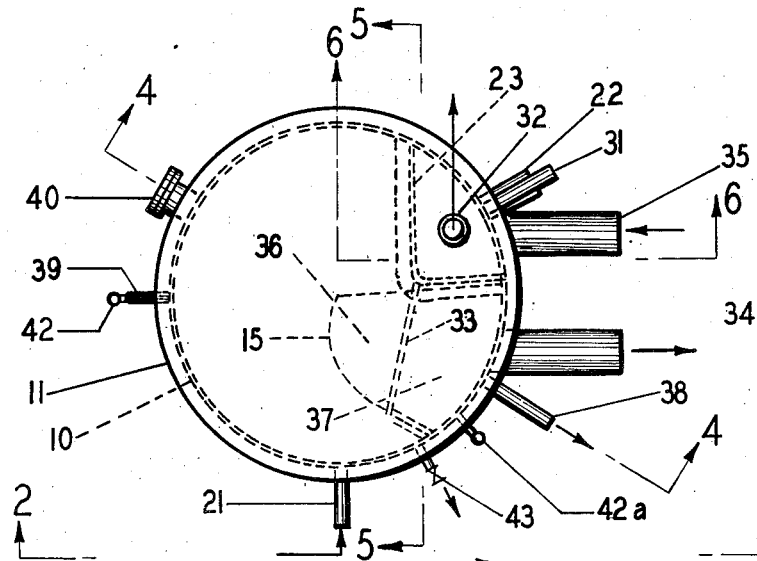
Figure 2:
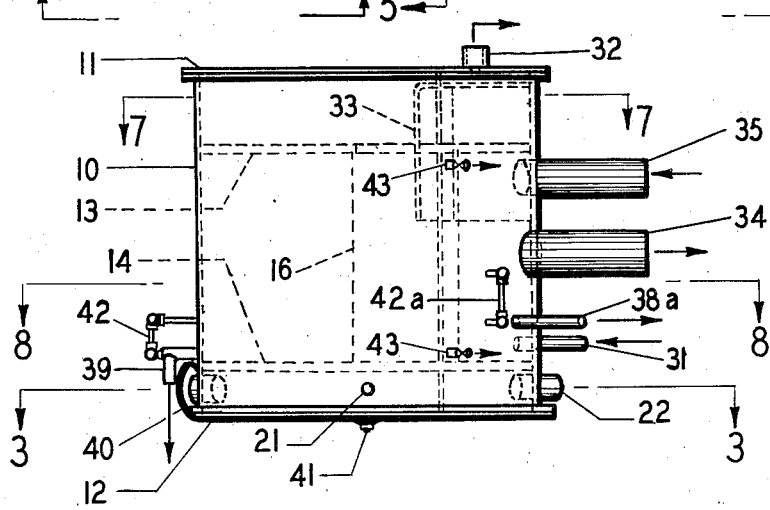
Fig. 2 is a side elevation looking in the direction of the arrows in Fig. 1.
Figure 3:
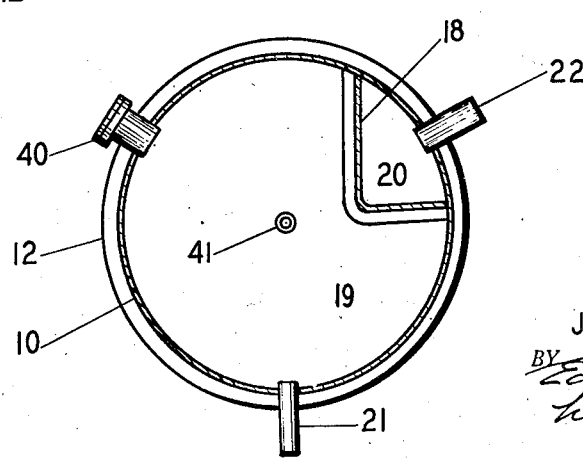
Fig. 3 is a view in horizontal section taken along the line 3—3 in Fig. 2.
Figure 4:
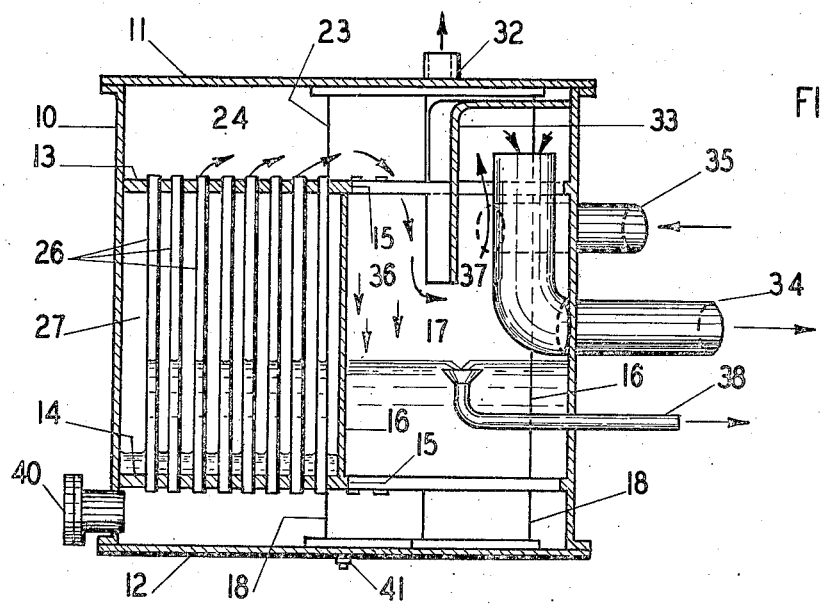
Fig. 4 is a view in vertical section taken along the line 4—4 in Fig. 1.
Figure 5:
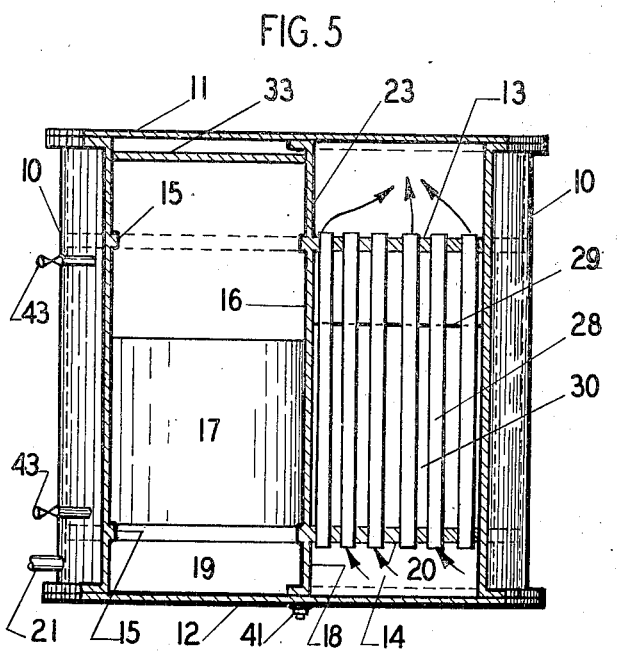
Fig. 5 is a view in vertical section taken along the line 5—5 in Fig. 1.
Figure 6:
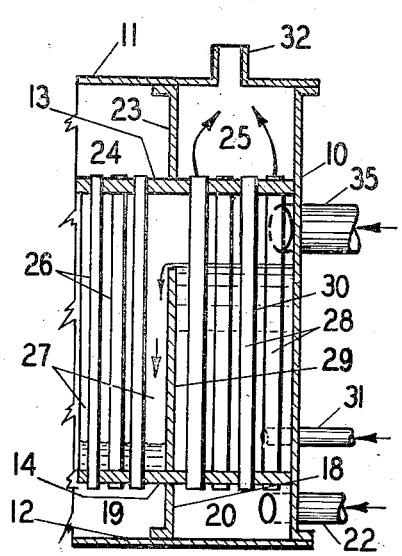
Fig. 6 is a view in vertical section taken along the line 6—6 in Fig. 1.
Figure 7:
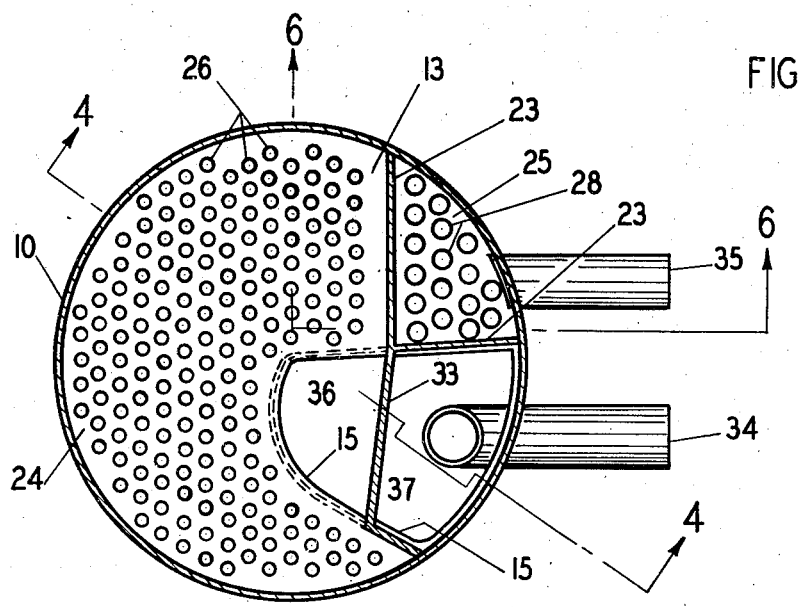
Fig. 7 is a view in horizontal section taken along the line 7—7 in Fig. 2.
Figure 8:
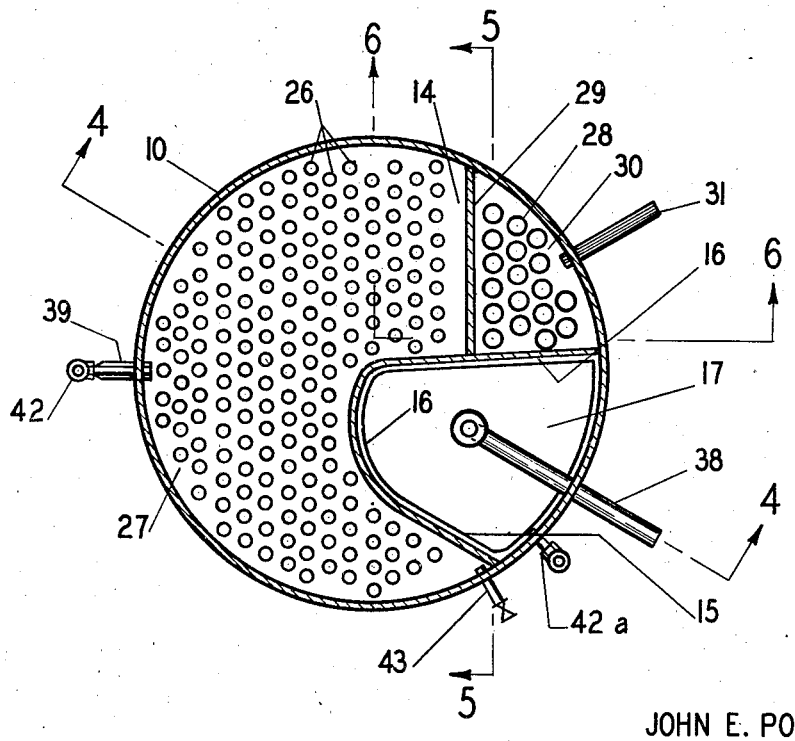
Fig. 8 is a view in horizontal section taken along the line 8—8 in Fig. 2.

Referring in detail to the drawings, 10 indicates the outer shell of the evaporator which is preferably cylindrical in shape, and which is closed at the top and bottom by the cover 11 and the bottom closure 12, respectively, which are preferably made removable so that access may be had to the tubes for cleaning. Any suitable means, not shown, are provided to seal the joints with the shell, such as gaskets.

13 and 14 indicate, respectively, the upper and the lower tube sheets which are fixed, as by welding in the interior of the shell adjacent to but spaced from the ends of the latter. Both of said sheets are provided with substantially triangular openings cut therein, as indicated at 15, said openings being vertically aligned with each other.

16 indicates a vertical partition of substantially angular cross sectional shape, the horizontal edges of which are welded to the tube sheets around two sides of the openings 15, while the vertical edges of the partition are welded to the wall of the shell. The openings 15 and the partition 16 with the wall of the shell form the open ended downtake 17 of the evaporator.

18 indicates a partition of angular cross sectional shape, the top edge of which is welded to the under side of the lower tube sheet 14 and the vertical edges of which are welded to the wall of the shell. The lower edge of the partition is provided with a flat flange which fits against the bottom closure 12 forming a sealed joint therewith. The partition 18 divides the space between the lower tube sheet and the bottom closure, into two chambers 19 and 20, the former being the solution admission chamber to which the solution to be evaporated is admitted by the pipe 21, and the other being a chamber into which hot gases such as the exhaust gases from an internal combustion engine are supplied by the pipe 22.

23 indicates a partition, similar in cross sectional shape to the partition 18, the lower edge of which is welded to the upper surface of the upper tube sheet 13 and the vertical edges of which are welded to the wall of the shell. The top edge of the partition 23 is provided with a flat flange which fits the under surface of the cover 11 and has a sealed joint therewith. The two partitions 18 and 23 are vertically aligned with each other.

The partition 23 divides the space between the upper tube sheet and the cover into two chambers, the vapor chamber 24 and the hot gas chamber 25.

26 indicates a bank of vertical tubes having their opposite ends fixed in the tube holes in the upper and lower tube sheets and connecting the solution chamber 19 with the vapor chamber 24. The space between the tube sheets through which the tubes 26 extend forms the solution heating chamber 27.

28 indicates a second bank of tubes which have their opposite ends fixed in the tube holes of the upper and lower tube sheets and connect the chambers 20 and 25 for the upward passage of hot gases.

29 indicates a baffle having the same cross sectional shape as that of the partition 18 and aligned therewith, the lower edge of the baffle 29 being welded to the lower tube sheet while its vertical edges are welded to the wall of the shell, thus forming a chamber 30 into which a liquid is introduced through the pipe 31. Preferably the baffle extends upwardly about three-fourths of the distance to the upper tube sheet, thus providing for a sufficient supply of pure liquid. The space between the top of the baffle 29 and the upper tube sheet provides communication between the chambers 30 and 27. 32 is a port in the cover 11 for the escape of spent gases from the chamber 25.

33 indicates a baffle depending in the downtake 17, the cross sectional shape of which is angular with the vertical edges of the partition welded to the wall of the shell. At its upper end the baffle 33 is provided with a horizontal wall having an arcuate perimetral edge which fits against the wall of the shell and is welded thereto just below the top of the latter.

It will be observed that the baffle 33 divides the upper portion of the downtake 17 into two passages for the vapors, a passage 36 through which the vapors travel downwardly and a passage 37 through which the vapors travel upwardly to enter the conduit 34.

34 indicates a vapor withdrawal conduit having its inner end extending upwardly within the space enclosed by the baffle 33.

Where steam is used as the principal heating medium in the heating chamber 27, the conduit 34 withdraws from the evaporator the vapors evolved from the solution in the tubes 26 and conducts the same to a condenser or other apparatus.

35 indicates a conduit leading to an opening in the shell of the evaporator, which conduit, where steam is employed as the principal heating medium conducts such steam to the heating chamber 27.

Where the vapors are compressed and the compressed vapors are to be used in the evaporator as the principal heating medium for the solution in the tubes 26, the conduit 34 is connected to the inlet of the compressor while the conduit 35 is connected to the outlet of the compressor.

38 indicates the constant level blowdown pipe the intake end of which, preferably funnel shaped, is positioned within the downtake 17 at the level at which the solution is to stand in the downtake and in the solution tubes 26. The downtake leads out through the wall of the shell 10.

39 indicates the pipe for the withdrawal of the condensate from the chamber 27.

The evaporator is equipped with the usual accessories, such as the clean-out connection 40, the drain plug 41, the liquid level gauges 42 and 42a, indicating, respectively, the levels of liquid in the chambers 27 and 30, and the vents 43 for the escape of non-condensed or non-condensable gases.

Pure liquid, such as of the same character as the condensate produced by the evaporator, is introduced through the pipe 31 into the chamber surrounding the tubes 28, and is heated and boiled by hot gases introduced from any selected source through the pipe 22 into the chamber 20 and traveling up through the tubes 28 and escaping through the chamber 25 and outlet 32, causing the liquid in the chamber 30 to boil.

The steam from the boiling liquid in the chamber 30 and the excess liquid flow over the baffle 29 into the heating chamber 27 where they mingle with the main heating medium and the condensate, and by out-of-contact heat exchange with the solution in the tubes 26 causes vapors to be evolved from the solution, which vapors rise into the vapor chamber 24, and pass into the upper end of the downtake 17, first traveling downwardly through the passage 36 until they reach the lower end of the baffle 33 where the vapors abruptly reverse their direction of travel and pass upwardly in the passage 37 and escape through the conduit 34.

The abrupt reversal of travel of the vapors as they pass around the lower end of the baffle results in the downward discharge of such droplets of liquid which may be entrained in the vapors.

Any suitable supply of hot gases to the chamber 20 and the tubes 28 may be employed. Thus, for instance, hot gases from the combustion of fuel may be employed. In the case of the thermocompression operation, or in other operations wherein an internal combusion engine is employed, these gases conveniently may be the exhaust gases of the engine.

In instances where the condensate is pure water, the liquid supplied to the chamber 30 should be distilled water, such as a portion of the condensate produced by the evaporator.

The heat transfer between the vapors in the chamber 27 and the solution in the tubes 26 results in the condensation of the vapors in said chamber, and the condensate is led off from the lower portion of the chamber 27 through the condensate removal pipe 39.

The elevation of the intake end of the blowdown 38 determines the level of the solution in the evaporator and withdraws concentrated solution therefrom.

I claim:

1. In an evaporator the combination of a shell, top and bottom closures for the shell, a pair of tube sheets fixed in the shell in spaced relation with each other, and spaced from the closures, the space between the lower tube sheet and the bottom closure being divided into a solution chamber and a lower hot gas chamber, and the space between the upper tube sheet and the top closure being divided into a vapor chamber and an upper hot gas chamber, a bank of tubes having their opposite ends secured in the tube holes in said tube sheets and connecting the solution chamber with the vapor chamber, a walled heating chamber through which said bank of tubes extend, a downtake connecting the vapor chamber with the solution chamber, means for maintaining a supply of the solution to be evaporated in the solution chamber, in said bank of tubes and in said downtake, a second bank of tubes having their ends secured in the tube holes of the tube sheets and connecting the hot gas chambers, an upwardly extending partition rising from the lower tube sheet and completing a liquid chamber through which the second bank of tubes extends, means for introducing hot gas into the lower hot gas chamber to travel upwardly through the second bank of tubes, means for supplying a second liquid to said liquid chamber to be boiled by the hot gases, the evolved steam flowing into the heating chamber, means for conducting off the vapors evolved from the solution in the first bank of tubes, means for withdrawing excess solution from the downtake, and means for withdrawing the condensate from the heating chamber.

2. The structure of claim 1 characterized by the provision of means for separating the droplets of solution from the vapors during their travel from the first bank of tubes to the downtake.

3. A unitary evaporator structure comprising an outer enclosure, a bank of tubes in which a supply of the solution to be evaporated is maintained, a heating chamber through which said tubes extend, a second bank of tubes extending through said chamber and through which tubes hot gases are caused to travel, a baffle extending upwardly from the floor of the heating chamber and separating the lower portions of the two banks of tubes, means for maintaining a supply of liquid in the portion of the chamber walled off by the baffle and surrounding the second bank of tubes, which liquid is boiled by the hot gases and the steam thus generated flows over the baffle and evolves vapors from the solution in the first bank of tubes, means for withdrawing from the evaporator the vapors thus evolved, and means for withdrawing from the chamber the condensate from the steam.

4. In a unitary evaporator structure, the combination of a shell, spaced-apart upper and lower tube sheets mounted in the shell and completing between them a chamber, a bank of tubes extending through the chamber and having their open ends fixed in the tube shets, means for maintaining in said bank of tubes a supply of the solution to be evaporated, a second bank of tubes extending through the chamber and having their ends fixed in the tube sheets, a partition in said chamber extending upwardly therein and partially separating the respective portions of the chamber through which the two banks of tubes extend, thus providing access between the two portions of the chamber in the upper portion of the latter, means for maintaining a supply of a liquid to the portion of the chamber through which the second bank of tubes extend, means for passing hot gases through the second bank of tubes to boil said liquid the steam thus generated passing to the portion of the chamber through which the first bank of tubes extend, means for withdrawing from the first bank of tubes the vapors evolved therein, and means for withdrawing the condensate from the portion of the chamber through which the first bank of tubes extend.

JOHN E. POTTHARST, Jr.

REFERENCES CITED

The following references are of record in the file of this patent:

UNITED STATES PATENTS

| Number | Name | Date |
|---|---|---|
| 1,059,481 | Maslin | Apr. 22, 1913 |
| 1,623,941 | Sebald | Apr. 5, 1927 |
| 1,864,349 | Govers | June 21, 1932 |
| 2,072,713 | Folmsbee et al. | Mar. 2, 1937 |